United States Patent [19]
Nilson

[11] 3,804,708
[45] Apr. 16, 1974

[54] NUCLEAR REACTOR FUEL ROD
[75] Inventor: Wesley Gordon Nilson, Nyack, N.Y.
[73] Assignee: United Nuclear Corporation, Elmsford, N.Y.
[22] Filed: Nov. 24, 1971
[21] Appl. No.: 201,887

[52] U.S. Cl............. 176/68, 29/421, 72/700, 75/177, 176/91
[51] Int. Cl............................................. G21c 3/06
[58] Field of Search.......... 176/68, 91; 29/421, 516; 52/670; 72/367, 700; 75/177

[56] References Cited
UNITED STATES PATENTS
2,861,530  11/1958  Macha ................................. 29/421
3,212,988  10/1965  Ringot ............................... 176/91 R
3,154,848  11/1964  Powell ................................ 29/516

OTHER PUBLICATIONS
Structure of Metals, Barrett, First Edition, McGraw–Hill Book Company, 1943, pp. 410–411.

Primary Examiner—Carl D. Quarforth
Assistant Examiner—E. E. Lehmann
Attorney, Agent, or Firm—Pennie & Edmonds

[57] ABSTRACT

A nuclear reactor fuel rod is provided with cladding of zirconium alloy which is especially textured in order to reduce axial irradiation growth and to increase end of life ductility. In particular, the cladding is an elongated tube of zirconium alloy wherein the basal poles of the constituent metal crystals are oriented in directions having their principal components in the radial and axial directions.

6 Claims, 2 Drawing Figures

INVENTOR
Wesley Gordon Nilson
ATTORNEYS

NUCLEAR REACTOR FUEL ROD

BACKGROUND OF THE INVENTION

The present invention relates to an improved fuel rod for use in a nuclear reactor. More specifically, it relates to a nuclear fuel rod having a cladding of zirconium alloy which is especially textured in order to reduce axial irradiation growth and to increase end of life ductility.

Nuclear reactors are the principal means for converting the large amounts of energy released by nuclear fission into useful thermal energy. When a fissionable atom such as $U^{233}$, $U^{235}$, $Pu^{239}$, or $Pu^{241}$ absorbs a thermal neutron, there is a high probability that it will undergo nuclear fission, splitting into two fission products of lower atomic weight having great kinetic energy and emitting a number of neutrons. In a nuclear reactor, the kinetic energy of the fission products is dissipated as heat in the nuclear fuel elements, and this heat is removed from the reactor by a coolant in heat exchange relationship with the fuel elements. The fission neutrons are slowed down to thermal range by a moderator and, in turn, used to induce a subsequent fission in another atom in order to keep the reaction self-sustaining.

A typical commercial power reactor comprises, in essence, a reactor pressure vessel and a water cooled and moderated nuclear chain reacting core made up of a number of nuclear fuel element assemblies. Each fuel assembly comprises a parallel array of rod-type nuclear fuel elements. The fuel rods in each assembly are accurately spaced from each other throughout their lengths by one or more spacer arrangements intermediate their ends. Typically each individual fuel rod passes through a cell in the spacer in contact with suitable bearing surfaces.

The nuclear reactor fuel elements are typically comprised of pressed ceramic pellets of enriched uranium oxide clad in elongated zirconium alloy tubes. These cladding tubes are typically formed by the well-known rock rolling process.

One of the primary problems associated with nuclear reactor fuel rods is the problem of irradiation-induced cladding deformation. When the rods are subject to nuclear radiation for the prolonged periods of time characteristic of nuclear reactor operating cycles, they tend to grow longer in the axial direction (a process referred to as irradiation growth) and to grow thinner in the radial direction.

SUMMARY OF THE INVENTION

In accordance with the present invention, a nuclear reactor fuel rod is provided with cladding of zirconium alloy which is especially textured in order to reduce axial irradiation growth and to increase end of cycle life ductility. In particular, the cladding is an elongated tube of zirconium alloy wherein the basal poles of the constituent metal crystals are oriented in directions having their principal components in the radial and axial directions.

BRIEF DESCRIPTION OF THE DRAWINGS

The nature, features, and advantages of the present invention will appear more fully upon consideration of the illustrative embodiments of the invention now to be described in detail in connection with the accompanying drawings.

DETAILED DESCRIPTION

Figure 1:
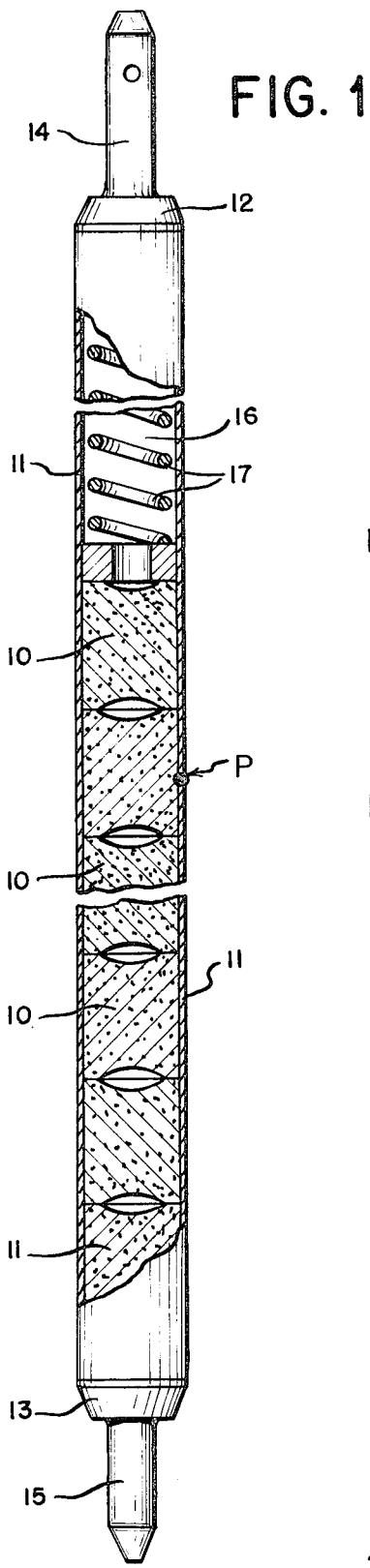
FIG. 1 is a longitudinal view in partial cross section of a nuclear reactor fuel element in accordance with the invention.

Referring to the drawings, FIG. 1 illustrates a nuclear reactor fuel element comprising a plurality of nuclear fuel pellets 10 of fissionable or fertile material positioned within a cladding tube 11 of especially textured zirconium alloy. The cladding tube is sealed at its ends by means of end plugs 12 and 13 which may include studs 14 and 15, respectively, to facilitate the mounting of the fuel rod in an assembly. A void space 16 is advantageously provided at one end of the fuel element to permit longitudinal expansion of the fuel material and accumulation of gases released from the fuel material. A helical member 17 may be positioned within space 16 to provide internal support for that part of the tube 11 which surrounds space 16 and which part is not otherwise supported against the external pressure of moderator-coolant fluids. Sufficient clearance is provided between the fuel and the walls of the tube to accommodate fuel swelling and differential thermal expansion between the tube and the cladding without overstressing the cladding.

The zirconium alloy cladding, unlike conventional cladding, is especially textured in order to reduce axial irradiation growth and to increase end of life ductility. In conventional rock rolled zirconium alloy tubing, the texture is such that the basal poles of the constituent metal crystals (i.e., perpendiculars to the basal planes of the crystals) are oriented in direction having their principal components in the directions extending radially outward from the fuel rod axis and extending tangential to the circumference of the tubing. In contrast, the texture of cladding in accordance with the invention has a texture such that the basal poles of the constituent metal are oriented in directions having their principal components in the radial and axial directions.

Figure 2:
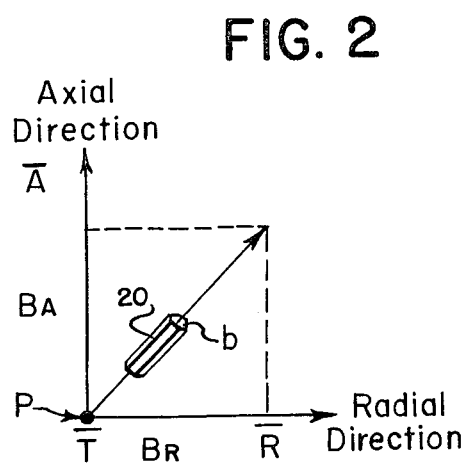
FIG. 2 is a schematic view of a zirconium alloy crystal illustrating the preferred direction of crystal orientation in the claddings of fuel rods in accordance with the invention.

This desired orientation is shown in FIG. 2 which schematically illustrates a metal crystal 20 located, for example, at point P, in the cladding of the fuel rod of FIG. 1. As illustrated, a zirconium alloy crystal typically has a hexagonal basal plane, $b$. In the desired orientation, a perpendicular to the basal plane has its principal components $B_R$ and $B_A$ in the radial, $\overline{R}$, and the axial, $\overline{A}$, directions, respectively. While a relatively small number of crystals will not be oriented in the desired direction, the metal crystals in the cladding are on a statistical basis predominantly oriented with their basal pole principal components in the radial and axial directions.

Textured cladding tubes in accordance with the invention can be made by any one of a number of methods which reduces the thickness of the tube wall and, at the same time, increases the tube diameter by an amount which is greater than any increase in length. For example, such tubes can be manufactured from conventional rock rolled Zircaloy tubing by hydraulically or mechanically expanding the tube diameter while constraining the tube ends to prevent an increase in length relatively greater than the increase in diameter. Nuclear fuel typically in the form of pellets of enriched uranium oxide is then disposed in the tube and its ends are sealed in accordance with techniques well known in the art.

Alternatively, the cladding tubes can be formed from zirconium alloy sheet stock having a pair of parallel edges by constraining these parallel edges to prevent expansion in the transverse direction and reducing its thickness by cold rolling. The sheet should be reduced in thickness to such an extent that the basal planes of constituent crystals are predominantly oriented in directions having their principal components perpendicular to the plane of the sheet and transverse to the parallel constrained edges. The sheet is then formed (e.g., by cutting) into a rectangle having its longest dimension transverse to the parallel edges, and this rectangle is rolled into a tube. The resulting seam is then welded by a process, such as resistance welding, which permits the continuity of the metal crystals across the seams.

Further information regarding the deformation required to produce a desired orientation texture in various zirconium alloys is set forth in detail in the paper "Texture and Anisotrophy of Zirconium in Relation to Plastic Deformation" presented at The International Symposium on Zirconium Alloys, Montreal, August, 1971.

Cladding rods made in accordance with any one of the above-described processes, or a combination thereof, exhibit the aforementioned desired texture. They also exhibit as compared with conventional rods lower irradiation growth in the axial direction, lower creep in the axial direction, and greater ductility in the tangential direction.

While applicant does not wish to be bound by this theory, it is believed that the irradiation of zirconium metal or alloy crystals results in an increase in the area of the basal plane accompanying a contraction in the dimension of the crystal perpendicular to the base. In cladding rods having conventional texture, the expansion of the basal plane extends predominantly in the axial direction. In cladding according to the invention, the growth of the basal planes extends to a significant degree in the tangential direction thereby reducing the axial growth.

It is understood that the above-described arrangements are merely illustrative of the many possible specific embodiments which can represent applications of the principles of the invention. Thus, numerous and varied other arrangements can be readily devised by those skilled in the art without departing from the spirit and scope of the invention.

I claim:

1. A fuel rod for use in a nuclear reactor having nuclear fuel disposed in an elongated tubular cladding member consisting predominantly of zirconium, said zirconium cladding member characterized in that the basal poles of the constituent metal crystals are predominantly oriented in directions having their principal components in the direction extending radially outward from the axis of said tubular member and in the direction extending axially along said elongated member in order to provide a fuel rod having reduced axial irradiation growth and increased end of life ductility.

2. A method for manufacturing a nuclear reactor fuel rod having reduced axial irradiation growth and increased end of life ductility comprising the steps of:
forming a tubular member consisting predominantly of zirconium;
reducing the thickness of the walls of said tubular member while constraining the length to increase by an amount relatively less than the increase in diameter;
disposing nuclear fuel in said tubular member; and
sealing the ends of said member.

3. The method of claim 2 wherein said tube is reduced in thickness to a sufficient extent that the constituent metal crystals are predominantly oriented in directions having their basal pole principal components oriented in the direction extending radially outward from the axis of said tubular member and in the direction extending axially along said tubular member.

4. The method of claim 2 wherein the diameter of said tube is expanded while the ends of said tube are constrained to prevent lengthening by an amount relatively greater than the increase in diameter.

5. A method for manufacturing a nuclear reactor fuel rod having reduced axial irradiation growth and increased end of life ductility comprising the steps of:
forming a sheet consisting predominantly of zirconium, said sheet having a pair of parallel edges;
constraining said pair of parallel edges to prevent expansion of said sheet in the direction transverse thereto;
cold rolling said constrained sheet in order to reduce its thickness and to elongate it in the direction parallel to said constrained edges;
forming a rectangle of said sheet having its longest dimension in the direction transverse to pair parallel edges;
forming said rectangle into a tube, thereby producing a seam;
welding said seam;
disposing nuclear reactor fuel in said expanded tubular member; and
sealing the ends of said member.

6. The method according to claim 5 wherein said sheet is reduced in thickness to such an extent that the basal planes of constituent crystals are predominantly oriented in directions having their principal components perpendicular to the plane of the sheet and transverse to the parallel constrained edges.

* * * * *